US010899613B2

(12) United States Patent
Chen et al.

(10) Patent No.: US 10,899,613 B2
(45) Date of Patent: Jan. 26, 2021

(54) GRAPHENE-CERAMIC COMPOSITE MEMBRANE FOR HYDROGEN SEPARATION MEMBRANES

(71) Applicants: University of South Carolina, Columbia, SC (US); CLEMSON UNIVERSITY, Clemson, SC (US)

(72) Inventors: Fanglin Chen, Irmo, SC (US); Shumin Fang, Lexington, SC (US); Kyle Brinkman, Aiken, SC (US); Siwei Wang, Columbia, SC (US); Jian He, Clemson, SC (US); Yufei Liu, Clemson, SC (US)

(73) Assignees: University of South Carolina, Columbia, SC (US); Clemson University Research Foundation, Clemson, SC (US)

( * ) Notice: Subject to any disclaimer, the term of this patent is extended or adjusted under 35 U.S.C. 154(b) by 166 days.

(21) Appl. No.: 16/158,366

(22) Filed: Oct. 12, 2018

(65) Prior Publication Data
US 2019/0119110 A1 Apr. 25, 2019

Related U.S. Application Data

(60) Provisional application No. 62/575,001, filed on Oct. 20, 2017.

(51) Int. Cl.
*C01B 3/50* (2006.01)
*C04B 35/50* (2006.01)
(Continued)

(52) U.S. Cl.
CPC ............ *C01B 3/503* (2013.01); *B01D 53/228* (2013.01); *B01D 53/326* (2013.01);
(Continued)

(58) Field of Classification Search
CPC .... B01D 53/22; B01D 53/228; B01D 53/326; B01D 67/0004; B01D 67/0083;
(Continued)

(56) References Cited

U.S. PATENT DOCUMENTS 5,820,655 A 10/1998 Gottzmann et al.
6,235,417 B1 5/2001 Wachsman et al.
(Continued)

FOREIGN PATENT DOCUMENTS

CN 107096394 B * 8/2017 .......... B01D 53/228
JP 1988-295402 5/1990

OTHER PUBLICATIONS

Kim, K.-I. et al., "Hydrogen permeation of TiN-graphene membrane by hot press sintering (HPS) process", Solid State Ionics, 225, 2012, pp. 699-702. (Year: 2012).*
(Continued)

*Primary Examiner* — Jason M Greene
(74) *Attorney, Agent, or Firm* — Dority & Manning, P.A.

(57) ABSTRACT

A hydrogen permeation membrane is provided that can include a carbon-based material (C) and a ceramic material (BZCYT) mixed together. The carbon-based material can include graphene, graphite, carbon nanotubes, or a combination thereof. The ceramic material can have the formula $BaZr_{1-x-y-z}Ce_xY_yT_zO_{3-\delta}$, where $0 \leq x \leq 0.5$, $0 \leq y \leq 0.5$, $0 \leq z \leq 0.5$, $(x+y+z)>0$; $0 \leq \delta \leq 0.5$, and T is Yb, Sc, Ti, Nb, Ta, Mo, Mn, Fe, Co, Ni, Cu, Zn, Ga, In, or a combination thereof. In addition, the BZYCT can be present in the C-BZCYT mixture in an amount ranging from about 40% by volume to about 80% by volume. Further, a method of forming such a membrane is also provided. A method is also provided for extracting hydrogen from a feed stream.

15 Claims, 3 Drawing Sheets

(51) Int. Cl.

| | |
|---|---|
| *B01D 53/32* | (2006.01) |
| *B01D 67/00* | (2006.01) |
| *B01D 53/22* | (2006.01) |
| *C04B 35/80* | (2006.01) |
| *B01D 69/14* | (2006.01) |
| *C04B 35/52* | (2006.01) |
| *C01F 17/206* | (2020.01) |
| *B01D 71/02* | (2006.01) |

(52) U.S. Cl.
CPC ..... *B01D 67/0004* (2013.01); *B01D 67/0072* (2013.01); *B01D 69/141* (2013.01); *C01F 17/206* (2020.01); *C04B 35/50* (2013.01); *C04B 35/522* (2013.01); *C04B 35/803* (2013.01); *B01D 71/021* (2013.01); *B01D 71/024* (2013.01); *B01D 2256/16* (2013.01); *C04B 2235/3215* (2013.01); *C04B 2235/3224* (2013.01); *C04B 2235/3225* (2013.01); *C04B 2235/3229* (2013.01); *C04B 2235/3232* (2013.01); *C04B 2235/3244* (2013.01); *C04B 2235/3251* (2013.01); *C04B 2235/3256* (2013.01); *C04B 2235/3262* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3286* (2013.01); *C04B 2235/425* (2013.01); *C04B 2235/5288* (2013.01); *C04B 2235/6581* (2013.01); *C04B 2235/6582* (2013.01); *C04B 2235/666* (2013.01); *C04B 2235/786* (2013.01); *C04B 2235/80* (2013.01)

(58) Field of Classification Search
CPC .. B01D 69/141; B01D 71/021; B01D 71/024; B01D 2256/16; C01B 3/503
See application file for complete search history.

(56) References Cited

U.S. PATENT DOCUMENTS

| | | | |
|---|---|---|---|
| 6,296,687 | B2 | 10/2001 | Wachsman et al. |
| 6,569,226 | B1 | 5/2003 | Dorris et al. |
| 7,393,384 | B2 | 7/2008 | Gopalan et al. |
| 9,005,486 | B2 | 4/2015 | Brinkman et al. |
| 9,023,550 | B2 | 5/2015 | Brinkman |
| 9,687,775 | B2 | 6/2017 | Chen et al. |
| 9,825,306 | B2 | 11/2017 | Chen et al. |
| 2003/0037488 | A1 | 2/2003 | Van Calcar et al. |
| 2005/0194571 | A1 | 9/2005 | Elangovan et al. |
| 2009/0136695 | A1* | 5/2009 | Damani ............... B01D 69/141 428/34.4 |
| 2015/0314232 | A1* | 11/2015 | Chen .................... B01D 71/024 95/56 |
| 2018/0086984 | A1 | 3/2018 | Chen et al. |

OTHER PUBLICATIONS

English language machine translation for CN 107096394 B. Retrieved from translationportal.epo.org on May 21, 2020. (Year: 2020).*
Fan, et al. "Preparation and electrical properties of graphene nanosheet/ $Al_2O_3$ composites" *Carbon* 48(6) (2010) pp. 1743-1749.
Lim, et al. "Hydrogen selective thin palladium-copper composite membranes on alumina supports" *J. Memb. Sci.* 378 (2011) pp. 79.
Tuller, et al. "Micro-ionics: next generation power sources" *Physical Chemistry Chemical Physics* 11(17) (2009) pp. 3023-3034.

* cited by examiner

GRAPHENE-CERAMIC COMPOSITE MEMBRANE FOR HYDROGEN SEPARATION MEMBRANES

CROSS-REFERENCE TO RELATED APPLICATION

The present application claims priority to U.S. Provisional Application Ser. No. 62/575,001, filed on Oct. 20, 2017, the disclosure of which is incorporated by reference herein.

BACKGROUND

As an important raw material for the production of ammonia, methanol, and liquid hydrocarbons, hydrogen is mainly produced through catalytic steam reforming of methane, which is strongly endothermic and requires a high temperature (e.g., about 700° C. to about 900° C.) to achieve maximum conversion to $H_2$, CO, and $CO_2$ at high pressure (e.g., about 20 bar to about 40 bar). High purity hydrogen can then be directly obtained via a separation step such as hydrogen permeation through a proton-conducting membrane under a pressure gradient at high temperature. The application of membrane technology is expected to considerably reduce the capital and energy cost in hydrogen production. Composite membranes consisting of a $BaCeO_3$-based proton conductor and an electronic conductor (e.g. nickel) have been developed for this application. However, these membranes (e.g. Ni—$BaZr_{0.8-x}Ce_xY_{0.2}O_{3-\delta}$ (Ni-BZCY), $0.4 \le x \le 0.8$) suffer serious performance loss in $CO_2$-containing environments at 900° C. due to the reaction between $BaCeO_3$ and $CO_2$. In addition, such metal-ceramic composites often exhibiting volume changes during start-up and membrane cracking. Other metals that have been used in separation membranes include palladium. However, palladium membranes are very expensive and have a low hydrogen flux. Further, whether nickel, palladium, or some other metal is utilized, the decreased conductivity, which, in turn, results in reduced hydrogen separation performance (e.g., decreased hydrogen flux) means that hydrogen separation using such materials is inefficient and costly.

As such, a need exists for a high efficient separation membrane that exhibits improved hydrogen flux compared to metal-ceramic and metal-based separation membranes, while at the same time being cost-effective and stable at high temperatures.

SUMMARY

Objects and advantages of the invention will be set forth in part in the following description, or may be obvious from the description, or may be learned through practice of the invention.

A hydrogen permeation membrane is generally provided. In one embodiment, the hydrogen permeation membrane includes a carbon-based material and a ceramic material mixed together. The carbon-based material includes graphene, graphite, carbon nanotubes, or a combination thereof. The ceramic material has the formula:

$$BaZr_{1-x-y-z}Ce_xY_yT_zO_{3-\delta},$$

where $0 \le x \le 0.5$, $0 \le y \le 0.5$, $0 \le z \le 0.5$, $(x+y+z)>0$, $0 \le \delta \le 0.5$, and T is Yb, Sc, Ti, Nb, Ta, Mo, Mn, Fe, Co, Ni, Cu, Zn, Ga, In, or a combination thereof.

A method of forming a membrane is also generally provided. In one embodiment, the method includes mixing a carbon-based material and a ceramic powder to form a carbon-ceramic mixture; pressing the carbon-ceramic mixture to form a composite membrane; and sintering the carbon-ceramic mixture at a temperature of about 1100° C. to about 1700° C. The carbon-based material can include graphene, graphite, carbon nanotubes, or a combination thereof, and the ceramic powder can be a ceramic material having the formula:

$$BaZr_{1-x-y-z}Ce_xY_yT_zO_{3-\delta},$$

where $0 \le x \le 0.5$, $0 \le y \le 0.5$, $0 \le z \le 0.5$, $(x+y+z)>0$, $0 \le \delta \le 0.5$, and T is Yb, Sc, Ti, Nb, Ta, Mo, Mn, Fe, Co, Ni, Cu, Zn, Ga, In, or a combination thereof.

A method is also generally provided for extracting hydrogen from a feed stream. In one embodiment, the method includes exposing the feed stream to a first side of a membrane at a temperature of about 600° C. to about 1000° C., wherein the feed stream comprises hydrogen; and collecting pure hydrogen gas from a second side of the membrane opposite of the first side. The membrane includes a carbon-based material and a ceramic material. The carbon-based material includes graphene, graphite, carbon nanotubes, or a combination thereof. The ceramic material can have the formula:

$$BaZr_{1-x-y-z}Ce_xY_yT_zO_{3-\delta},$$

where $0 \le x \le 0.5$, $0 \le y \le 0.5$, $0 \le z \le 0.5$, $(x+y+z)>0$, $0 \le \delta \le 0.5$, and T is Yb, Sc, Ti, Nb, Ta, Mo, Mn, Fe, Co, Ni, Cu, Zn, Ga, In, or a combination thereof.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

DEFINITIONS

Figure 1:
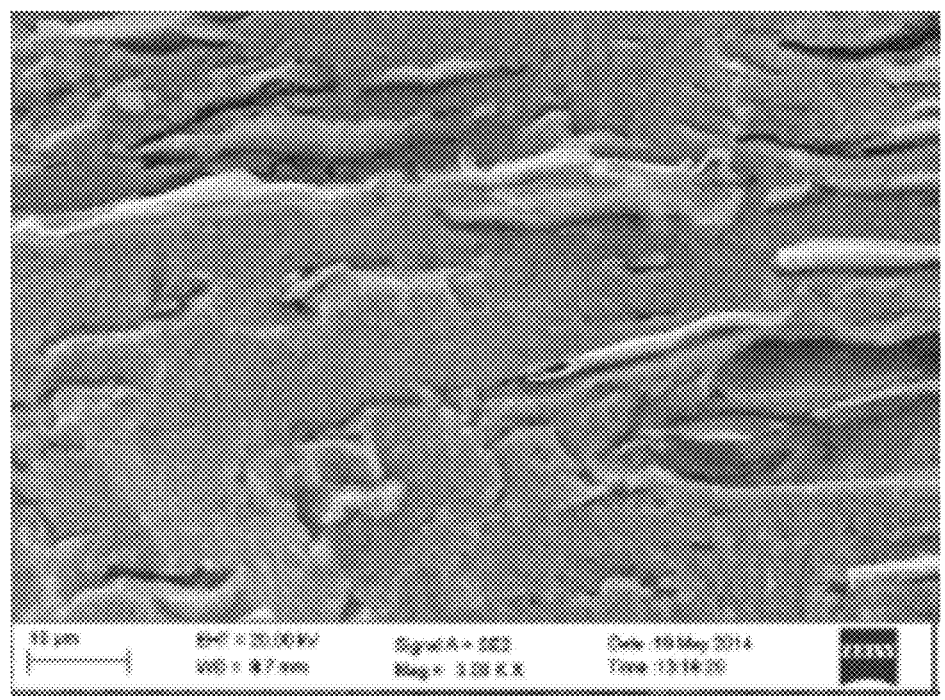
FIG. 1 shows a cross-sectional scanning electron microscopy (SEM) image of a sintered graphene and ceramic composite membrane as contemplated by the present invention, where graphene particles (about 20 micrometers) are embedded in the dense BZCYT ceramic matrix. The size of BZCYY grains is about 0.1 micrometers to about 0.2 micrometers. The membrane is very dense and free of pores.

Chemical elements are discussed in the present disclosure using their common chemical abbreviation, such as commonly found on a periodic table of elements. For example, carbon is represented by its common chemical abbreviation C; barium is represented by its common chemical abbreviation Ba; and so forth.

As used herein, the prefix "nano" refers to the nanometer scale up to about 100 nm. For example, particles having an average diameter on the nanometer scale (e.g., from about 0.1 nm to about 100 nm) are referred to as "nanoparticles."

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Composite carbon-ceramic membranes are expected to possess high hydrogen permeation flux, mechanical strength, and chemical stability, which are the key factors for successful adoption of hydrogen permeation membrane for practical applications. The carbon-based material can include graphene, graphite, carbon nanotubes, or a combination thereof. In addition, in contrast to metal-ceramic-based membranes, the present inventors have found that the carbon-ceramic-based membranes of the present invention do not tend to coarsen or sinter at high operating temperatures (e.g., the carbon-ceramic composite membranes have a higher maximum operating temperature), nor do the carbon-ceramic composite membranes experience significant volume changes during redox cycles (e.g., the carbon-ceramic composite membranes exhibit reduced thermal expansion problems). As such, the carbon-ceramic composite membranes are an improvement over existing hydrogen separation membrane technology. Moreover, with a reference temperature of 600° C., a 1 millimeter (mm) thick membrane, and a partial pressure driving force of 1 atm hydrogen at the feed side and $1 \times 10^{-7}$ atm at the exit side, the carbon-ceramic composite membranes of the present invention exhibit improved hydrogen flux (e.g., an improvement by at least an order of magnitude) compared to Pd metal (flux of $9 \times 10^{-4}$ mol m$^{-2}$ s$^{-1}$) and BZCYYb without graphene (flux of $2.8 \times 10^{-4}$ mol m$^{-2}$ s$^{-1}$). For instance, the carbon-ceramic composite membranes of the present invention can exhibit a hydrogen flux ranging from about $10 \times 10^{-3}$ mol m$^{-2}$ s$^{-1}$ to about $1 \times 10^{-4}$ mol m$^{-2}$ s$^{-1}$, such as from about $1.5 \times 10^{-3}$ mol m$^{-2}$ s$^{-1}$ to about $8 \times 10^{-4}$ mol m$^{-2}$ s$^{-1}$, such as from about $2 \times 10^{-3}$ mol m$^{-2}$ s$^{-1}$ to about $6 \times 10^{-4}$ mol m$^{-2}$ s$^{-1}$. In one particular embodiment, the carbon-ceramic composite membranes of the present invention can exhibit a hydrogen flux of about $3.1 \times 10^{-3}$ mol m$^{-2}$ s$^{-1}$. Further, the carbon-ceramic composite membranes of the present invention can exhibit improved conductivity compared to other ceramic based membranes. For instance, the conductivity of the carbon-ceramic composite membranes of the present invention can range from about 300 S cm$^{-1}$ to about 500 S cm$^{-1}$, such as from about 325 S cm$^{-1}$ to about 475 S cm$^{-1}$, such as from about 350 S cm$^{-1}$ to about 450 S cm$^{-1}$ at 600° C. in wet $H_2$.

Carbon-ceramic composite membranes are generally provided, along with their methods of preparation. In one embodiment, the carbon-ceramic composite membranes include

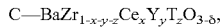

$$C-BaZr_{1-x-y-z}Ce_xY_yT_zO_{3-\delta},$$

where $0 \leq x \leq 0.5$, $0 \leq y \leq 0.5$, $0 \leq z \leq 0.5$, $(x+y+z)>0$, $0 \leq \delta \leq 0.5$, and T is Yb, Sc, Ti, Nb, Ta, Mo, Mn, Fe, Co, Ni, Cu, Zn, Ga, In, or a combination thereof. This structure is referred to herein as "C-BZCYT". In one embodiment, the first "C" in the structure C-BZCYT can be a carbon-based material, such as graphene, graphite, carbon nanotubes, or a combination thereof. Regardless of the particular carbon-based material utilized, the volume ratio of BZCYT in the composite ranges from about 40% and about 80% by volume, such as from about 40% to about 75% by volume, such as from about 40% to about 70% by volume.

The C-BZCYT membranes show excellent high hydrogen permeation flux and chemical stability in $H_2O$, $CO_2$, $H_2S$ and other contaminants. Commercially available graphene, graphite, and/or carbon nanotubes can be used as the source of the carbon-based material phase. Sintering-active BZCYT powders and the carbon-based material are mixed, pressed, and sintered to obtain dense composite membranes. The membranes show stable performance in the presence of concentrated $CO_2$, $H_2S$.

The invention provides composite membranes based on a mixture of a carbon-based material phase and a ceramic phase for hydrogen permeation. Hydrogen can diffuse through the membrane in the form of atoms through the carbon-based material phase or protons through the ceramic (e.g., BZCYT) phase. The membranes have a thickness ranging from about 0.1 millimeters (mm) to about 5 mm, such as from about 0.25 mm to about 4 mm, such as from about 0.5 mm to about 2 mm. The critical properties of the membranes include permeation flux, chemical stability in $H_2O$, $CO_2$, and $H_2S$-containing atmosphere.

The membranes of the present invention are useful for extracting hydrogen from any feed stream containing hydrogen with a pressure between 1 and 1000 psi at a temperature between 600° C. and 1200° C., such as from about 650° C. to about 1100° C., such as from about 700° C. to about 1000° C. Theoretically, 100% pure hydrogen is obtained because the membranes are dense and allow no other gas to pass through. The flux of the membrane can be affected by many parameters, including phase composition of BZCYT phase, the volume ratio of the carbon-based material and the ceramic material, the membrane thickness, the temperature, and the humidity content in the feed gas.

The method of forming such membranes can include mixing a carbon-based material and a BZCYT powder, pressing the mixture, and sintering the mixture at a temperature ranging from about 1100° C. and about 1700° C. The sintering atmosphere can be reducing atmosphere (e.g., 5% $H_2/N_2$). The atmosphere can also be first in inert gas ($N_2$, Ar, etc.) and then in reducing atmosphere containing hydrogen (e.g., 5% $H_2/N_2$).

Example

Hydrogen separation membranes based on high temperature proton conductors have been pursued for a long time due to their potential to greatly reduce the energy and capital cost of large-scale hydrogen production from steam methane reforming (SMR). A key to their successful application is the development of a membrane with high performance, chemical and mechanical stability. Ni-oxide cermet composites have been widely used for composite materials for high temperature hydrogen separation membrane applications as well as anode materials for solid oxide fuel cells. While the ceramic phase functions as the ionic conducting phase, Ni is the main electronic conducting phase for the mixed conduction in the membrane. Such Ni-cermet anode contains a large volume ratio of Ni to maintain sufficient electrical conductivity, but yet suffers significant carbon deposition under low steam content in steam-reforming methane, which is mainly caused by methane thermal cracking. Additionally, the presence of a large ratio of Ni tends to cause coarsening and sintering at high operating temperatures and also leads to serious volume change during redox cycles.

The recently developed graphene has the potential to be used in various applications due to its high electrical conductivity, excellent mechanical properties, high specific surface area, unique graphitic basal plane structure, and potential low manufacturing cost. Accordingly, the present example focuses on the introduction of graphene into a material to enhance the mechanical strength, toughness, electrical conductivity, and thermal conductivities of the composites in an attempt to avoid the disadvantages and concerns inherited from the conventional Ni-cermet anode for high temperature hydrogen separation membranes.

Experimental:

First, $BaCe_{0.7}Zr_{0.1}Y_{0.1}Yb_{0.1}O_{3-\delta}$ (denoted as BCZYY afterwards) powder was prepared by a modified Pechini method. All chemicals were obtained from Alfa Aesar with purity >99.5%. The concentration of the metal ions in the individual nitrate was titrated. Citric acid (Alfa Aesar, 99%) and ethylenediaminetetraacetic acid (EDTA, Alfa Aesar, 99%) were used as chelating and complexing agents. Ammonium hydroxide (Sigma-Aldrich, $NH_3$ content 28.0 to 30.0%) was added to promote the dissolution of EDTA in deionized water. The metal precursors were then stoichiometrically added into the chelating and complexing agents with metal nitrates:citric acid:EDT at a molar ratio of 1:1.5:1.2. The solution was stirred at room temperature for 24 hours to achieve full complexation, followed by heat treatment in a microwave oven (Oster, Model No. OM0701N8E, output power 800 W, 2450 Hz) to assist in foaming. After 10 minutes of microwave heat treatment, a batch of dry foam was formed. The dry foam was subsequently fired at 600° C. for 4 hours in air to remove organic residue, resulting in light-colored powders. The powder was then calcined at different temperatures between 700° C. and 1200° C. to obtain BZCYYb powder. The homemade graphene powder was mechanically mixed with the as prepared BZCYYb powder. The volume ratio of graphene was 40%. The composite powders were filled into a graphite die with a diameter of 12.7 mm, and sintered by the Spark Plasma Sintering machine (Dr. Sinter 1020, Sumitomo Coal Mining Co.). This process was accomplished by applying a constant 4 MPa axial pressures and an increasing AC current (100 A $min^{-1}$) simultaneously to the die in dynamic vacuum (about 10 Pa), while the temperature of the sample was monitored by a pyrometer until the temperature reached 1200° C. for 5 minutes.

Results and Discussion:

FIG. 1 shows the X-ray diffraction of the C-BZCYYb sample SPS sintered at 1200° C. It can be seen that the majority of the phases are graphene and BZCYYb ceramic phase. There is trace amount of $BaCO_3$ during SPS sintering, probably caused by the reaction between Ba and $CO_2$ formed by oxidation of graphene.

Figure 2A:
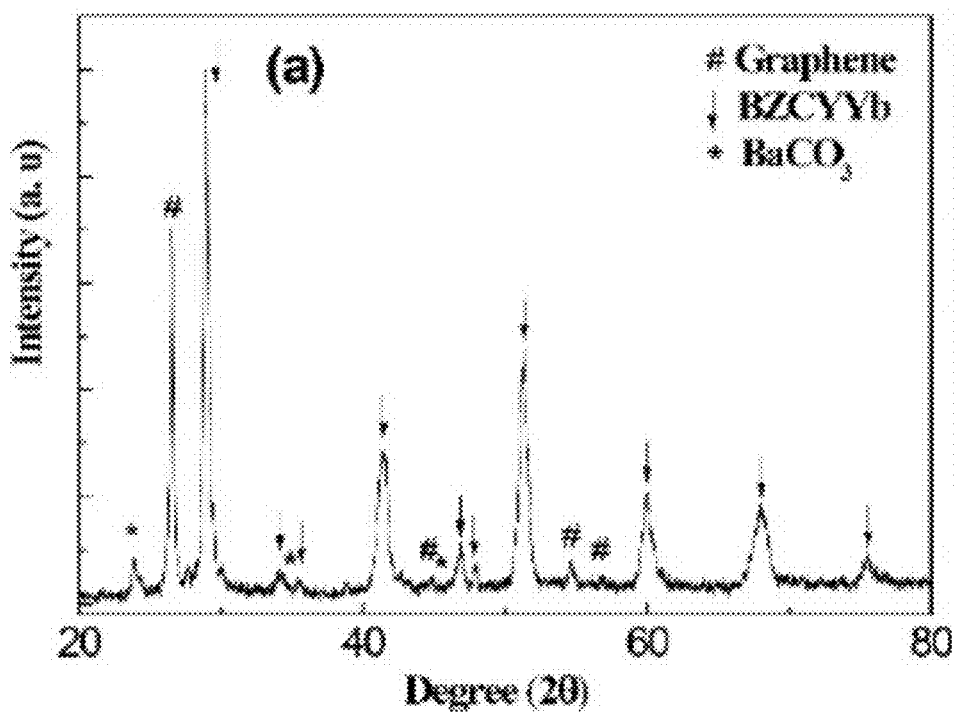
FIG. 2a shows the XRD pattern of a sintered graphene-ceramic composite of the present invention. The XRD patterns only shows XRD peaks corresponding to BZCYYb or graphene phases, suggesting that the BZCYYb and graphene phases remained stable and do not react with each other.
Figure 2B:
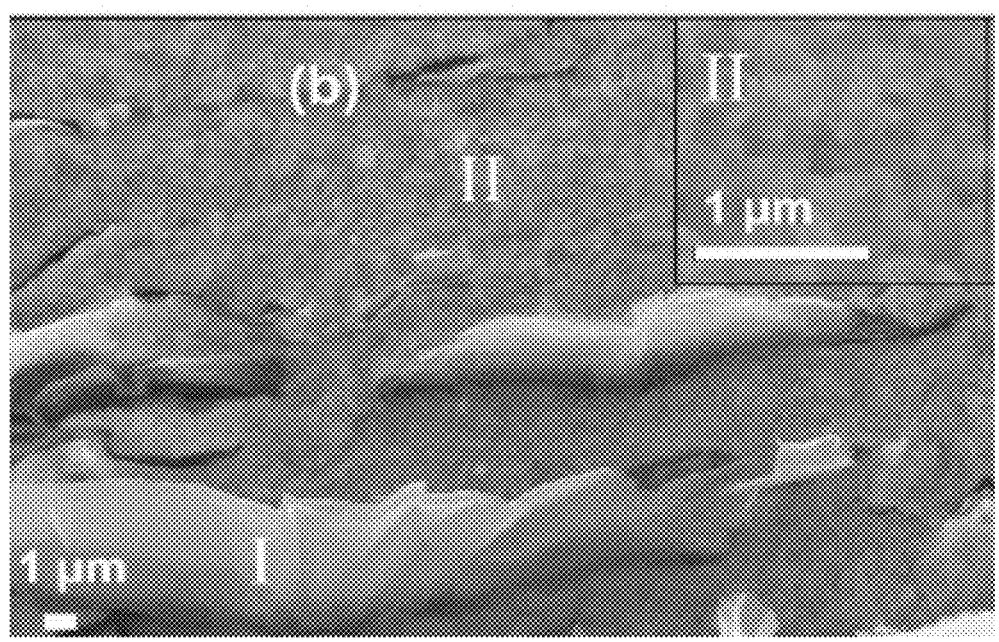
FIG. 2b shows a surface SEM image of a graphene-BZCYYb composite sintered by spark plasma sintering (SPS) at 1200° C.
Figure 2C:
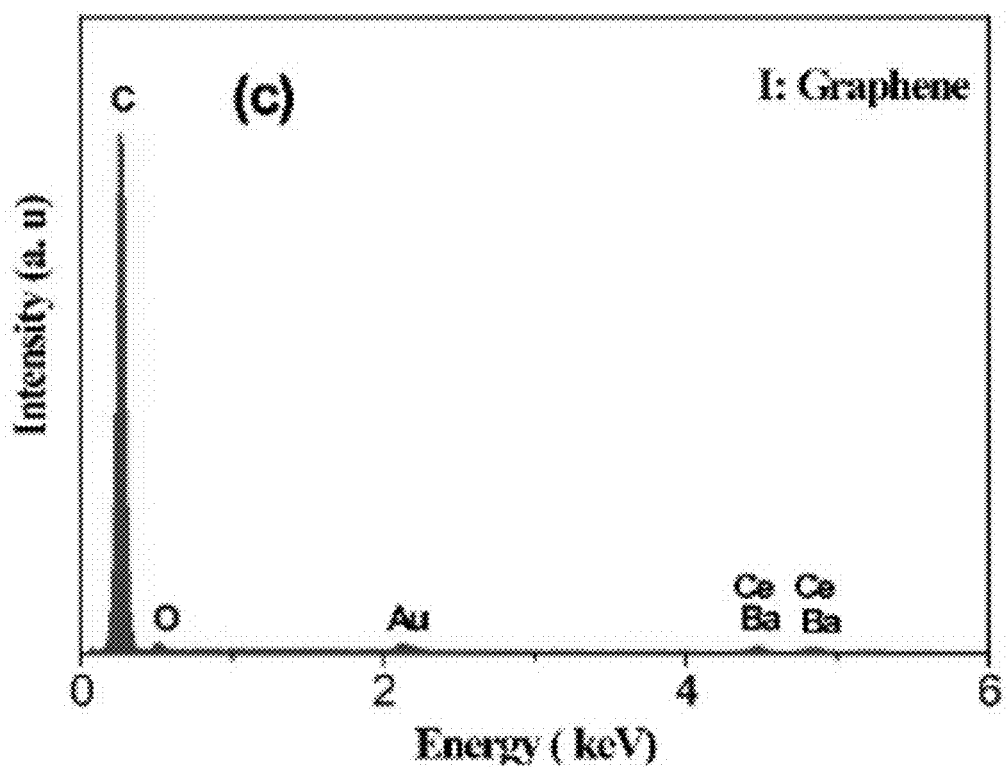
FIG. 2c shows the EDX spectra of the layered area I (graphene) shown in FIG. 2b.
Figure 2D:
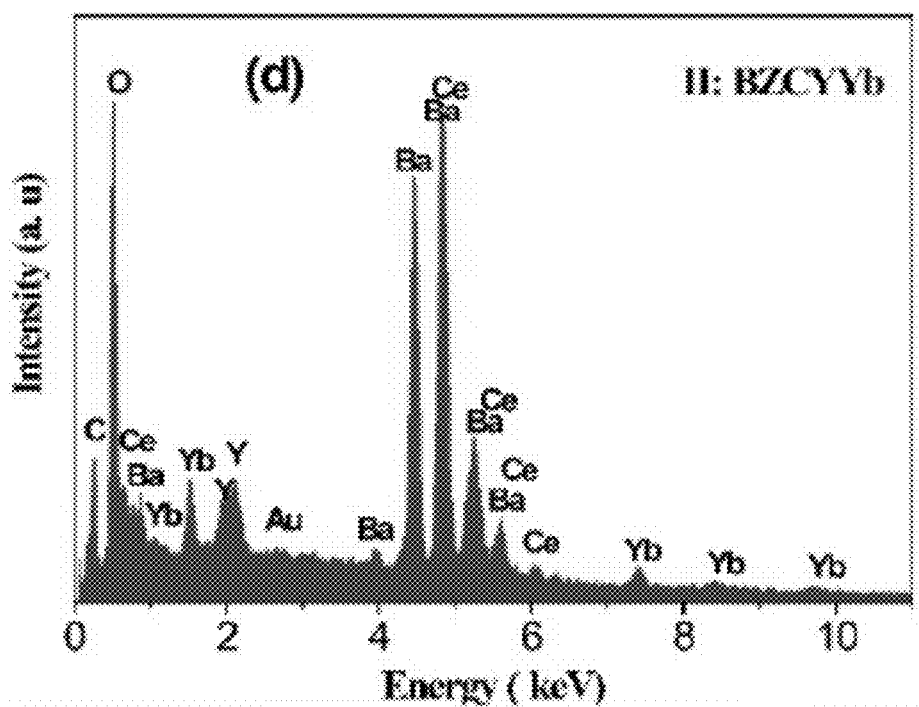
FIG. 2d shows the EDX spectra of the grained area II (BZCYYb) shown in FIG. 2b.

FIG. 2b shows the cross-sectional scanning electron microscopy image of the C-BZCYYb composite sintered by SPS at 1200° C. The flake shaped graphene is distributed within dense BZCYYb ceramic matrix. EDS spectra confirms that the flakes are carbon based graphite. The obtained graphene flakes are around 20 μm in length. It is noted that the C-BZCYYb composite is easier to be sintered than pure BZCYYb by SPS. Because the graphite has a low resistance and high conductivity, it draws a large current through the circuit during the SPS, and this large current will heat up the graphite rapidly due to frictional heating as the charges migrate through the circuit. The addition of ceramic phase function as the resistance into the circuit and the heat will mostly be applied onto the ceramic. Such strategy also applies to the SPS sintering of other electronic conductor-ceramic composite materials.

It is noted that such densification was accomplished by SPS due to the uniqueness of SPS process. On one hand, the SPS provides ultrafast heating rate to sinter dense BZCYYb ceramic at a relatively lower temperature, and the conventional sintering temperature for BZCYYb ceramics is around 1500° C. for several hours; On the other hand, the SPS sintering is processed in vacuum atmosphere under pressure, with a $9.9 \times 10^{-5}$ atm and $3 \times 10^7$ Pa pressure to ensure the graphite phase (as well as the graphite die) do not decompose at high temperature.

Figure 3:
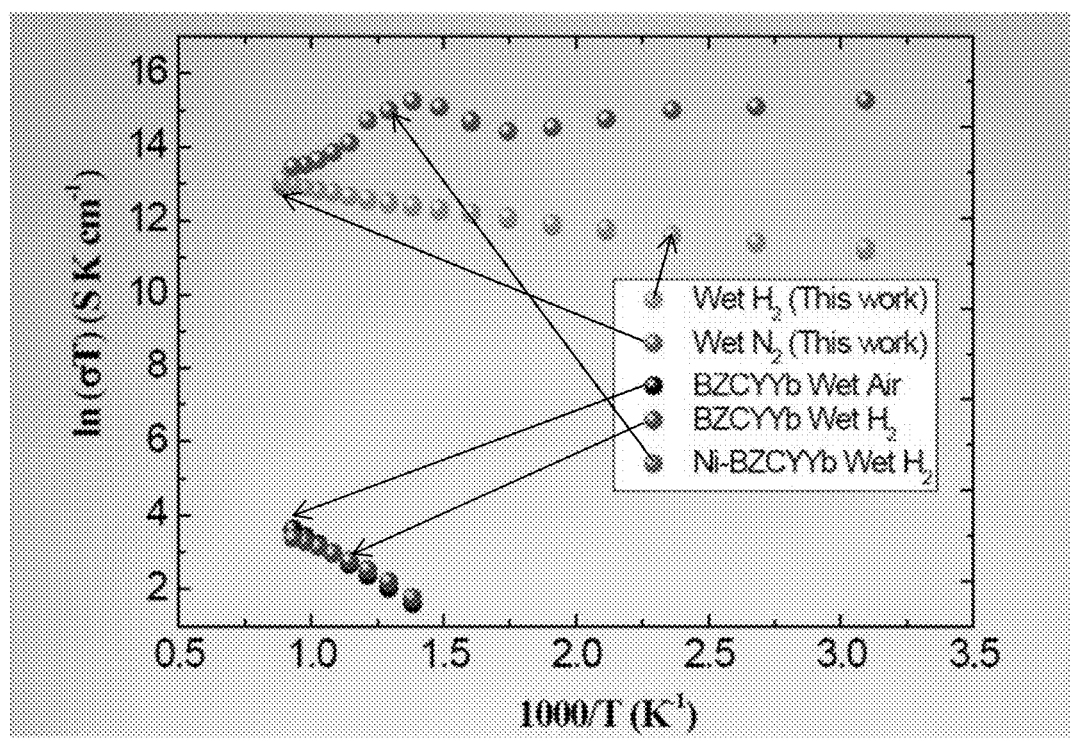
FIG. 3 shows conductivity of the sintered graphene-BZCYYb composite ceramic in different atmospheres.

The C-BZCYYb composite shows excellent conductivity in reducing atmospheres. The conductivity measurement was carried out in wet $N_2$ and wet $H_2$ atmospheres (3% water partial pressure, introduced by passing the gas through a water bubbler at room temperature) at a temperature range of 50° C.-850° C. A conductivity value of 359 and 364 S $cm^{-1}$ at 600° C. in wet $N_2$ and $H_2$, respectively, has been obtained (FIG. 3). Compared with pure ceramic BZCYYb phase, which shows a conductivity of about $1 \times 10^{-2}$ S $cm^{-1}$ at 600° C. in wet $H_2$, there is a several orders of magnitude improvement in the total conductivity, which is thought to be mainly attributed to the electronic conduction brought by graphene.

These changes have a large impact on the material's hydrogen flux. The hydrogen flux can be described as:

$$J_{H_2} = -\frac{RT}{4F^2L} \int_{\ln P'_{H_2}}^{\ln P''_{H_2}} \frac{\sigma_e \sigma_H}{\sigma_e + \sigma_H} d\ln P_{H_2} \qquad (1)$$

where R is gas constant (8.314 J/mol K), T temperature (K), F Faraday's constant (96485 C $mol^{-1}$), L thickness ($1 \times 10^{-3}$ m in this case, or 1 mm), $P_{H2}$ partial pressure of hydrogen, and $\sigma_e$ and $\sigma_H$ electronic conductivity and proton conductivity, respectively. From the data in FIG. 3, using a reference temperature of 600° C., with a 1 mm thick membrane with a partial pressure driving force of 1 atm hydrogen at feed side and $1 \times 10^{-7}$ atm hydrogen at the product side, an order of magnitude increase in hydrogen flux compared to a pure phase, conventionally sintered BZCYYb sample (assuming the ionic transport number of BZCYYb at 600° C. is 0.9) is obtained. For instance, the hydrogen flux obtained for the BZCYYb sample without graphene is $2.8 \times 10^{-4}$ mol $m^{-2}$ $s^{-1}$ compared to a hydrogen flux of $3.1 \times 10^{-3}$ mol $m^{-2}$ $s^{-1}$ for a membrane with graphene, while a Pd metal membrane having a thickness of 1 mm at 400° C. has a hydrogen flux of about $9 \times 10^{-4}$ mol $m^{-2}$ $s^{-1}$.

CONCLUSIONS

Spark plasma sintered graphene-BZCYYb composite with 40% volume ratio of graphene showed a two-phase graphene and BZCYYb structure. The obtained composite showed dense microstructure, with graphene flakes surrounded by dense BZCYYb ceramic. C-BZCYYb with 40% volume ratio of graphene possesses excellent electrical conductivity under reducing atmospheres. The conductivity value in general is between Ni-BZCYYb and BZCYYb. A conductivity value of 364 S cm$^{-1}$ at 600° C. in wet H$_2$ was obtained. The calculated hydrogen flux from the C-BZCYYb is $3.1 \times 10^{-3}$ mol m$^{-2}$ s$^{-1}$, about one order of magnitude higher than BZCYYb ceramic without graphene, and higher than the state-of-the-art Pd metal based hydrogen separation membranes. The above description provides an example of an easily made, and cheap alternative of electronic-ionic composite for H$_2$ separation under reducing atmospheres.

These and other modifications and variations to the present invention may be practiced by those of ordinary skill in the art, without departing from the spirit and scope of the present invention, which is more particularly set forth in the appended claims. In addition, it should be understood that the aspects of the various embodiments may be interchanged both in whole or in part. Furthermore, those of ordinary skill in the art will appreciate that the foregoing description is by way of example only, and is not intended to limit the invention so further described in the appended claims.

What is claimed:

1. A hydrogen permeation membrane, comprising: a carbon-based material and a ceramic material mixed together, wherein the carbon-based material comprises graphene, graphite, carbon nanotubes, or a combination thereof, and wherein the ceramic material has the formula:

$$BaZr_{1-x-y-z}Ce_xY_yT_zO_{3-\delta}$$

where $0<x\leq0.5$, $0<y\leq0.5$, and $0<z\leq0.5$, $0\leq\delta\leq0.5$, and

T is Yb, Sc, Ti, Nb, Ta, Mo, Mn, Fe, Co, Ni, Cu, Zn, Ga, In, or a combination thereof.

2. The hydrogen permeation membrane of claim 1, comprising the ceramic material in about 40% to about 80% by volume.

3. The hydrogen permeation membrane of claim 1, wherein the hydrogen permeation membrane has a thickness of about 0.01 mm to about 10 mm.

4. The hydrogen permeation membrane of claim 1, wherein the carbon-based material is graphene.

5. The hydrogen permeation membrane of claim 1, where $0<\delta\leq0.5$.

6. A method of forming a membrane, comprising:
mixing a carbon-based material and a ceramic powder to form a carbon-ceramic mixture, wherein the carbon based material comprises graphene, graphite, carbon nanotubes, or a combination thereof;
pressing the carbon-ceramic mixture to form a composite membrane; and
sintering the carbon-ceramic mixture at a temperature of about 1100° C. to about 1700° C., wherein the ceramic powder comprises a ceramic material having the formula:

$$BaZr_{1-x-y-z}Ce_xY_yT_zO_{3-\delta}$$

Where $0<x\leq0.5$, $0<y\leq0.5$, and $0<z\leq0.5$; $0\leq\delta\leq0.5$, and T is Yb, Sc, Ti, Nb, Ta, Mo, Mn, Fe, Co, Ni, Cu, Zn, Ga, In, or a combination thereof.

7. The method of claim 6, wherein the carbon-ceramic mixture is sintered in a reducing atmosphere.

8. The method of claim 7, wherein the reducing atmosphere comprises H$_2$.

9. The method of claim 7, further comprising: heating the carbon-ceramic mixture is in an inert atmosphere prior to sintering in the reducing atmosphere.

10. The method of claim 9, wherein the inert atmosphere comprises N$_2$.

11. The method of claim 9, wherein the inert atmosphere comprises Ar.

12. The method of claim 6, wherein the carbon-based material is graphene.

13. The method of claim 6, where $0\leq\delta\leq0.5$.

14. The method of claim 6, wherein the carbon-based material and the ceramic powder are mixed such that the carbon-ceramic mixture comprises the ceramic material in amount ranging from about 40% by volume to about 80% by volume.

15. A method of extracting hydrogen from a feed stream, comprising:
exposing the feed stream to a first side of a membrane at a temperature of about 600° C. to about 1000° C., wherein the feed stream comprises hydrogen; and
collecting pure hydrogen gas from a second side of the membrane opposite of the first side,
wherein the membrane comprises a carbon-based material and a ceramic material, wherein the carbon-based material includes graphene, graphite, carbon nanotubes, or a combination thereof, and wherein the ceramic material has the formula:

$$BaZr_{1-x-y-z}Ce_xY_yT_zO_{3-\delta}$$

where $0<x\leq0.5$, $0<y\leq0.5$, and $0<z\leq0.5$, $(x+y+z)>0$; $0\leq\delta\leq0.5$, and T is Yb, Sc, Ti, Nb, Ta, Mo, Mn, Fe, Co, Ni, Cu, Zn, Ga, In, or a combination thereof.

* * * * *